United States Patent Office 2,940,779
Patented June 14, 1960

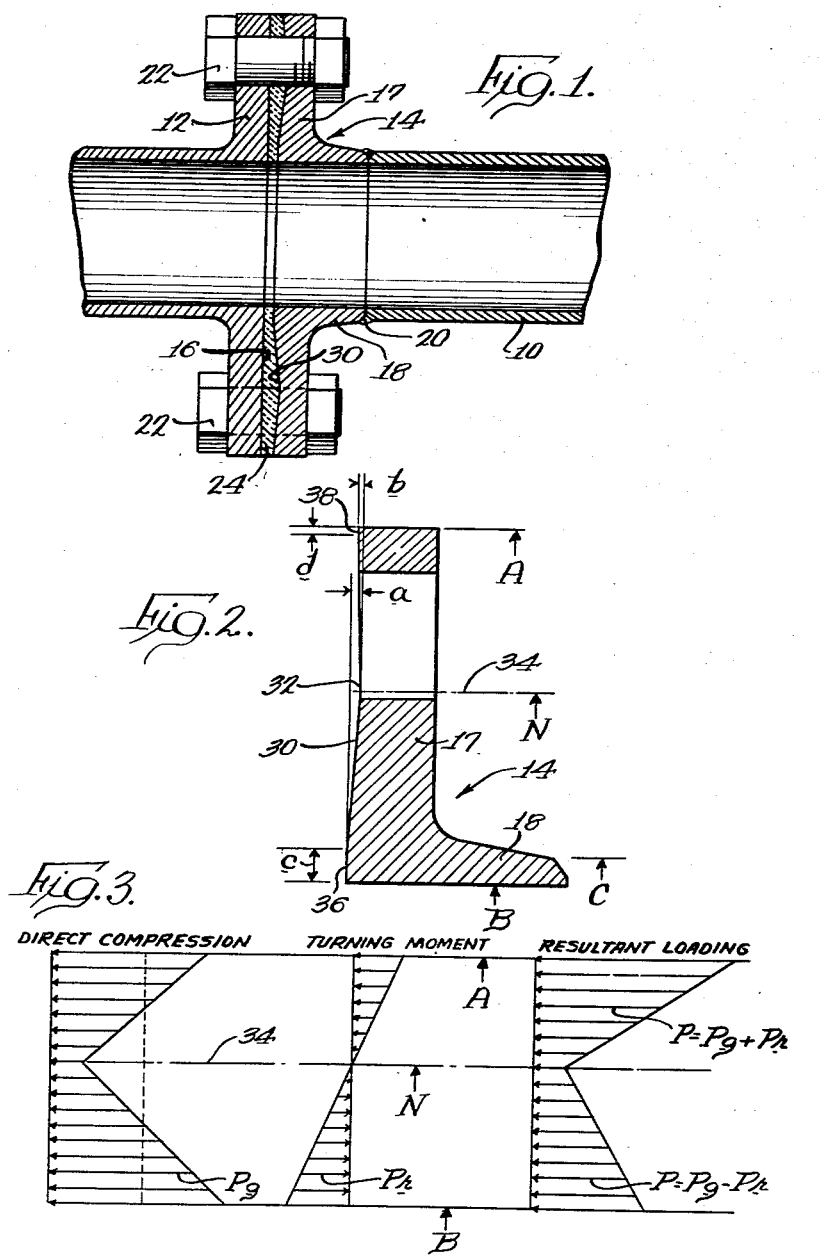

2,940,779
BALANCED FACE FLANGE

Amerigo Joseph Del Buono, Western Springs, Ill., assignor to Taylor Forge & Pipe Works, Cicero, Ill., a corporation of Illinois Filed Nov. 8, 1957, Ser. No. 695,420

4 Claims. (Cl. 285—114)

The present invention relates to flanged pipe joints, and particularly, to an improved flange therefor.

In assembling conduits and installing valves and the like therein, it is common practice to connect adjacent pipe and/or valve sections by bolting together opposed flanges at the adjacent ends of the sections, with a sealing gasket therebetween. Heretofore, two principal types of flanges have been employed, namely, the flat face and taper face types. With the flat face type, bolting of the flanges together results in an initial distribution of pressure uniformly over the flange face. Upon application of internal pressure in the conduit, the flange is subject to a turning moment tending to separate the two flanges at their inner margins, and consequently forcing the flanges together adjacent their outer margins. By virtue of this moment, compressive load is relieved adjacent the inner margin of the flange, with a resultant decrease in sealing capacity.

The taper face flange is intended to overcome this disadvantage by compensating for the turning moment caused by internal pressure. In particular, by tapering the flange face rearwardly in the radially outward direction, compressive force is initially distributed over the face in progressively increasing relation in the radially inward direction, thereby directly to compensate for the turning moment and afford a resultant uniform distribution of pressure over the flange face. Thus, adequate sealing pressure is attained at the inner margin of the flange. However, this advantage is offset by loss of the resisting couple or counter moment which is afforded by the flat face flange to the aforesaid turning moment due to increased pressure at the outer margin of the flange. Because of this loss, the taper flange and its companion, for given loads, are necessarily of relatively heavy section.

Thus, it is apparent that the known types of flanges, while affording certain respective advantages, suffer severe shortcomings.

The object of the present invention is the provision of an improved flange enjoying the advantages of both the flat and taper face flanges, but suffering the disadvantages of neither, and affording additional advantages as well.

A more specific object of the invention is the provision of an improved flange face, which I have termed a balanced face, characterized by axial relief intermediate the inner and outer margins thereof, by virtue of which I obtain initial concentration of pressure adjacent the inner and outer margins of the flange to afford both high pressure sealing against internal pressure in the conduit and an effective moment counter to the turning moment caused by internal pressure.

Another object of the invention is to provide an improved flange face that is axially recessed at substantially the neutral axis of the flange and tapers forwardly therefrom both radially inwardly and radially outwardly of the flange to take optimum advantage of and afford selective compensation for the turning moment caused by internal pressure.

A further object of the invention is the provision of an improved flange face of the character defined wherein the inner marginal portion of the face projects slightly forwardly of the outer marginal portion of the face to compensate for the pressure relieving component of the turning moment caused by internal pressure in the conduit, thereby to afford a high sealing pressure adjacent the inner margin of the flange without loss of an effective counter moment at the outer margin of the flange.

A still further object of the invention is to so relieve and taper the intermediate areas of the flange face as to compress the sealing gasket radially as well as axially, thereby to impart stability to the gasket, prevent radial displacement of the gasket under pressure, and increase the overall resilience of the joint thereby to maintain an unrelaxed bolt load on the joint.

Other objects and advantages of the invention will become apparent in the following detailed description of a preferred embodiment of the invention.

Now, in order to acquaint those skilled in the art with the manner of making and using my balanced face flange, I shall describe, in connection with the accompanying drawing, a preferred embodiment of my flange and a preferred manner of making the same.

In the drawing:

Figure 1 is a longitudinal section of a flanged pipe joint embodying the flange of the invention;

Figure 2 is an enlarged detail of the cross section of my balanced face flange; and Figure 3 is a graphic analysis of the initial loading, the turning moment and the resultant loading of said flange.

Referring now to the drawing, and particularly to Figure 1, I have shown a section of pipe 10 connected to the flanged end 12 of a valve housing, fitting, or the like by means of my improved flange, which is indicated generally at 14. In the pipe joint illustrated, the flanged member and the pipe are formed of ferrous metals, and the flange 14 of the invention, for such use, suitably comprises a steel forging. Apart from the attachment of the flange 14 to the pipe section 10, however, the materials of construction are not particularly critical. In conventional installations, the valve housing or fitting may be an integral cast iron member or may be formed from other materials which could be fractured or distorted during connection to the pipe section. The construction of this member especially is not critical, as the flange of the invention compensates for deficiencies in the same, as will presently appear. The flange 12 of such member is customarily provided with a flat radial outer face 16, as illustrated.

The flange 14 generally complements the pipe section 10, the same comprising an annular ring portion 17 and a welding neck or collar 18 having inner and outer diameters equal substantially to the inner and outer diameters of the pipe. The adjacent ends of the welding neck and the pipe section 10 are suitably relieved so as to define a V-groove facilitating welding of the neck to the pipe, as indicated at 20, when the flange is aligned with the end of the pipe and abutted against it. The radial extent of the ring portion of the flange 14 is generally the same as that of the flange 12, and the flanges are provided with aligned bolt holes for reception of a plurality of bolts 22.

A conventional annular gasket 24 of substantially uniform thickness is confined between the opposed faces of the flanges 12 and 14 to seal the joint. The nature of the gasket is not particularly critical, but an asbestos gasket $\frac{1}{16}$ or $\frac{1}{8}$ inch thick, or a soft corrugated non-ferrous gasket is suggested, a $\frac{1}{8}$ inch thick asbestos gasket being preferred.

The flange 14 as provided according to the present invention is characterized by the annular sealing face 30 thereof, which is shown in detail in Figure 2. The dominant feature of the face 30 is axial relief of the same, as indicated as 32, intermediate the inner and outer margins of the face. The point of maximum relief is preferably substantially coincident with the neutral axis 34 of the flange, and the face preferably tapers uniformly forward from said axis both radially inwardly and radially outwardly of the axis. The neutral axis 34 of the flange is the axis about which the flange tends to flex upon occurrence of internal pressure in the pipe, i.e., the axis of the turning moment caused by internal pressure. It will be appreciated, therefore, that the neutral axis is actually a circular line and that axial relief of the face in the manner described results in an annular recess concentric with the flange.

To effect gasket compression over a sufficiently large area for sealing purposes, especially adjacent the inner margin of the flange, the face preferably includes relatively small radial portions 36 and 38 at the inner and outer margins thereof. Between each marginal portion and the neutral axis of the flange, the face tapers uniformly inward, but there is no need for the tapered portions to be at the same angle or of the same radial extent. Specifically, it is preferred that the portion 36 at the inner margin of the face projects slightly forwardly of and be somewhat larger than the portion 38 at the outer margin of the face for purposes to be described.

Due to the configuration of the face 30 of my improved flange 14, direct compressive load, $Pg$, is distributed over the face in the manner illustrated at the left in Figure 3, whereby compression is relieved at the central portion of the face in order to achieve high concentration of pressure at the margins of the face. For sake of comparison, the dotted line represents what would be uniform distribution of the pressure. As will be observed, pressure concentration at the inner margin of the face is greater than at the outer margin due to the forward projection of the inner margin.

The turning moment caused by internal pressure in the pipe or conduit, which takes place about the neutral axis 34, is illustrated in the center representation of Figure 3 wherein the face separating pressure exerted to the inner (lower) side of the neutral axis and the compressive force to the outer (upper) side of said axis is indicated by $Pr$.

The resultant loading $P$ of the flange, i.e., $Pg-Pr$ to the inner side of the neutral axis and $Pg+Pr$ to the outer side of the neutral axis, is illustrated at the right in Figure 3. As illustrated, a relatively high force in compression is maintained at the inner margin of the flange, which pressure is exerted over the face portion 36 to assure sealing of the joint against internal pressure in the pipe. At the same time, the load at the outer margin of the face is increased to such degree as to exceed the loading at the inner margin thereby to provide an effective resisting force or moment counter to the turning moment caused by internal pressure in the pipe.

The flange of the invention thus attains the advantages of both the flat and taper face flanges without suffering the shortcomings of either. Specifically, the sealing pressure at the inner margin of the face is at least as great as the sealing pressure that would be afforded by a comparable taper face flange, and the counter moment is actually appreciably greater than the counter moment that would be afforded by a comparable flat face flange.

The particular benefit of the counter moment is attainment of a flange strengthening effect due to the modulus of the gasket, thereby to reduce stress and permit use of a thinner flange. This effect accrues also to the benefit of the companion flange 12, thereby affording a substantial safety factor when that flange is formed of cast iron or a material which could be fractured during bolting up. The flange of the invention is therefore further characterized as a safe, economical, light weight flange.

In addition, due to the reverse tapers at opposite sides of its neutral axis, the flange face affords the particular advantage of radially compressing the gasket, thereby to lend stability to the gasket and prevent radial displacement of the same under load. Also, the overall resilience which serves to maintain an unrelaxed bolt load is improved through radial flexure of the flange ring. These advantages are entirely absent in use of the flat or taper face flanges.

Relative to design criteria, it is to be observed that the dimensioning of the flange is not especially critical and that reasonable variations from the illustrated form may be adopted without loss of the above stated advantages. For this reason, the formula on which a specific design may be based are generally approximations to be varied within the skill of the art. It is, however, particularly desirable to have the point or circle of maximum relief substantially coincident with the neutral axis of the face. The diameter of this circle may suitably be determined by the formula $$N \approx \frac{2}{3}\left(\frac{A^3-B^3}{A^2-B^2}\right)$$

where $N$ is the diameter of the neutral axis, $A$ is the outer diameter of the flange and $B$ is the inner diameter of the flange.

The extent to which the face should be recessed at its neutral axis is generally proportional to the outer diameter of the pipe 10 to be coupled and it is expressed by the formula $$a \approx \frac{1}{16} \times \frac{C}{12}$$

where $a$ is the total extent of axial recessing and $C$ is the outer diameter of the pipe 10. For example, assuming that the flange is used with a pipe end having an outer diameter of twelve inches, the formula would be $$a = \frac{1}{16} \times \frac{12}{12}$$

which gives an axial depth of $\frac{1}{16}$ of an inch of the recess or relief depression at its vertex. Accordingly, under the formula stated the axial depth of the relief depression should be approximately $\frac{1}{16}$ of an inch for each twelve inches of outside diameter of the pipe end.

The inner marginal portion 36 of the face, since it affords the primary sealing surface for internal pressure, is of greater radial extent than the outer marginal portion 38 and is also preferably projected slightly forwardly of the outer marginal portion. Specifically, the size relationship of the portions 36 and 38 to one another is suitably expressed by the formula $$\frac{c}{d} \approx \frac{A}{C}$$

where $c$ is the radial extent of the inner marginal portion 36, $d$ is the radial extent of the outer marginal portion 38 and $A$ and $C$ are, respectively, the outer diameter of the flange 14 and the outer diameter of the pipe 10.

Both the axial offset of the two portions 36 and 38 and the radial extent of the portion 38 may suitably be about $\frac{1}{2}$ of the maximum recessing of the face, i.e., approximately $\frac{1}{2}$ of the distance $a$ between the point 32 of maximum relief and the inner marginal portion 36 of the face.

In view of the foregoing, it is to be appreciated that the present invention provides an improved flange of relatively simple design and particular economy accomplishing all of the previously stated objects in a convenient and practical manner and affording, in particular, effective sealing of the joint, an effective force counter to the turning moment of the flange, and radial as well as axial compression of the gasket.

While I have shown and described what I believe to be the preferred embodiment of my invention, it is apparent that various changes, rearrangements and modifications may be made therein without departing from the scope of the invention, as defined by the appended claims.

I claim:

1. A forged steel bolting flange having an annular sealing surface and provided with bolt holes in its outer peripheral portion, said flange being particularly adapted for use with a pipe end in a bolted joint comprising said flange and a second opposed cast iron flange with a compressible sealing gasket initially of substantially uniform thickness confined under bolting pressure between said flanges and extending throughout the full area of said sealing surface and radially outward thereof beyond said bolt holes, the radially inner marginal portion of said sealing surface providing a radially inner annular flat seating surface and the radially outer marginal portion of said sealing surface providing a radially outer flat seating surface of materially less radial extent than said inner seating surface, said sealing surface further comprising a first frusto-conical surface extending from said inner seating surface at a uniform inclination radially and axially outward of said flange and a second frusto-conical surface extending from said outer seating surface at a uniform inclination radially inward and axially outward of said flange and intersecting said first inclined surface defining therewith an annular relief depression of materially greater radial extent than either of said seating surfaces and of substantially flattened V shape in cross section with its vertex approximately coincident with the neutral axis of said flange, the axial depth of said depression at its vertex being approximately $\frac{1}{16}$ of an inch per twelve inches of outside diameter of a pipe end with which said forged steel flange is used, said radially inner seating surface being disposed axially inward of said flange beyond said radially outer seating surface approximately one half of the axial depth of said depression at its vertex.

2. A bolting flange having an annular sealing surface and provided with bolt holes in its outer peripheral portion, said flange being adapted for use with a pipe end in a bolted joint comprising said flange and a second opposed flange with a compressible sealing gasket initially of substantially uniform thickness confined under bolting pressure between said flanges and extending throughout the full area of said sealing surface and radially outward beyond said bolt holes, the radially inner marginal portion of said sealing surface providing a radially inner annular flat seating surface and the radially outer marginal portion of said sealing surface providing a radially outer flat seating surface of materially less radial extent than said inner seating surface, said sealing surface further comprising a first frusto-conical surface extending from said inner seating surface at a uniform inclination radially and axially outward of said flange and a second frusto-conical surface extending from said outer seating surface at a uniform inclination radially inward and axially outward of said flange and intersecting said first inclined surface defining therewith an annular relief depression of materially greater radial extent than either of said seating surfaces and of substantially flattened V shape in cross section with its vertex approximately coincident with the neutral axis of said flange, the axial depth of said depression at its vertex being approximately $\frac{1}{16}$ of an inch per twelve inches of outside diameter of a pipe end with which said forged steel flange is used.

3. A bolted pipe joint comprising two tubular members aligned end to end and bolting flanges secured to the ends of said members and bolted together by bolts passing through the outer peripheral portions thereof with a sealing gasket initially of substantially uniform thickness confined under bolting pressure between opposed sealing surfaces of said flanges and extending throughout the full area of the sealing surface of one of said flanges and radially outward thereof beyond said bolts, the radially inner marginal portion of said sealing surface of said one flange providing an inner annular flat seating surface and the radially outer marginal portion of said sealing surface of said one flange providing an outer annular seating surface of materially less radial extent than said inner seating surface, said sealing surface further comprising a first frusto-conical surface extending from said inner seating surface at a uniform inclination radially and axially outward of said one flange and a second frusto-conical surface extending from said outer seating surface radially inward and axially outward of said one flange and intersecting said first inclined surface defining therewith an annular relief depression of materially greater radial extent than either of said seating surfaces and of substantially flattened V shape in cross section with its vertex approximately coincident with the neutral axis of said one flange, the axial depth of said depression at its vertex being approximately $\frac{1}{16}$ of an inch per twelve inches of outside diameter of the end of the tubular member to which said one flange is secured, said radially inner seating surface being disposed axially inward of said one flange beyond said radially outer seating surface approximately one half of the axial depth of said depression at its vertex, said radially inner and outer seating surfaces of said one flange being effective in cooperation with the corresponding areas of the other flange for subjecting the marginal portions of said gasket to sealing pressure substantially axially of said one flange and said inclined surfaces of said one flange being effective in cooperation with the corresponding areas of the other flange for subjecting the portion of said gasket corresponding to said relief depression to pressure both inward and outward of said one flange radially thereof and to pressure axially of said one flange thereby compressing said gasket in said depression for stabilizing said gasket and restraining it against radial displacement under load.

4. A bolted pipe joint comprising two tubular members aligned end to end and bolting flanges secured to the ends of said members and bolted together by bolts passing through the outer peripheral portions thereof with a sealing gasket initially of substantially uniform thickness confined under bolting pressure between opposed sealing surfaces of said flanges and extending throughout the full area of the sealing surface of one of said flanges and radially outward thereof beyond said bolts, the radially inner marginal portion of said sealing surface of said one flange providing an inner annular flat seating surface and the radially outer marginal portion of said sealing surface of said one flange providing an outer annular flat seating surface of materially less radial extent than said inner seating surface, said sealing surface further comprising a first frusto-conical surface extending from said inner seating surface at a uniform inclination radially and axially outward of said one flange and a second frusto-conical surface extending from said outer seating surface radially inward and axially outward of said one flange and intersecting said first inclined surface defining therewith an annular relief depression of materially greater radial extent than either of said seating surfaces and of substantially flattened V shape in cross section with its vertex approximately coincident with the neutral axis of said one flange, the axial depth of said depression at its vertex being approximately $\frac{1}{16}$ of an inch per twelve inches of outside diameter of the end of the tubular member to which said one flange is secured, said radially inner and outer seating surfaces of said one flange being effective in cooperation with the corresponding areas of the other flange for subjecting the portion of said gasket corresponding to said relief depression to pressure both inward and outward of said one flange radially thereof and to pressure axially of said one flange thereby compressing said gasket in said depression for stabilizing said gasket and restraining it against radial displacement under load.

References Cited in the file of this patent

UNITED STATES PATENTS

| | | |
|---|---|---|
| 115,917 | Wharton | June 13, 1871 |
| 515,119 | Edwards | Feb. 20, 1894 |
| 683,485 | Osbourn | Oct. 1, 1901 |
| 2,289,164 | Arnold | July 7, 1942 |
| 2,299,813 | Franks | Oct. 27, 1942 |
| 2,688,500 | Scott | Sept. 7, 1954 |
| 2,780,483 | Kessler | Feb. 5, 1957 |
| 2,786,696 | Feldmeier | Mar. 26, 1957 |

FOREIGN PATENTS

| | | |
|---|---|---|
| 195,219 | Great Britain | Mar. 29, 1923 |
| 909,806 | France | Jan. 7, 1946 |